US010952167B2

(12) United States Patent
Kazmi et al.

(10) Patent No.: US 10,952,167 B2
(45) Date of Patent: Mar. 16, 2021

(54) TECHNIQUE FOR PERFORMING DEVICE-TO-DEVICE OPERATION

(71) Applicant: Telefonaktiebolaget LM Ericsson (publ), Stockholm (SE)

(72) Inventors: Muhammad Kazmi, Sundbyberg (SE); Iana Siomina, Täby (SE); Santhan Thangarasa, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 33 days.

(21) Appl. No.: 16/324,566

(22) PCT Filed: Jul. 26, 2017

(86) PCT No.: PCT/EP2017/068821
§ 371 (c)(1),
(2) Date: Feb. 10, 2019

(87) PCT Pub. No.: WO2018/028983
PCT Pub. Date: Feb. 15, 2018

(65) Prior Publication Data
US 2019/0223122 A1 Jul. 18, 2019

Related U.S. Application Data

(60) Provisional application No. 62/374,266, filed on Aug. 12, 2016.

(51) Int. Cl.
*H04W 56/00* (2009.01)
*H04W 4/70* (2018.01)
*H04L 5/00* (2006.01)

(52) U.S. Cl.
CPC ............ *H04W 56/001* (2013.01); *H04W 4/70* (2018.02); *H04W 56/005* (2013.01); *H04W 56/0065* (2013.01)

(58) Field of Classification Search
CPC ............ H04W 76/14; H04W 56/0015; H04W 56/001; H04W 56/002; H04W 72/04;
(Continued)

(56) References Cited

U.S. PATENT DOCUMENTS

| 2014/0250972 A1 | 9/2014 | Achanta et al. |
| 2015/0271771 A1* | 9/2015 | Park .................. H04W 56/0015 370/350 |

(Continued)

FOREIGN PATENT DOCUMENTS

| CN | 101455012 A | 6/2009 |
| WO | WO 2014/158064 A1 | 10/2014 |

OTHER PUBLICATIONS

International Search Report and Written Opinion of the International Searching Authority for International Application No. PCT/EP2017/068821 dated Oct. 17, 2017.

(Continued)

*Primary Examiner* — Sai Aung
(74) *Attorney, Agent, or Firm* — Sage Patent Group

(57) ABSTRACT

Methods and Devices for performing a device-to-device, D2D, operation are disclosed. A first reference timing for each of two or more non-terrestrial synchronization sources is obtained. Further a second reference timing of a terrestrial synchronization source is obtained. One of the non-terrestrial synchronization sources is determined based on a comparison between the first reference timings and the second reference timing, and the D2D operation is performed using the first reference timing of the determined non-terrestrial synchronization source.

18 Claims, 10 Drawing Sheets

(58) Field of Classification Search
CPC .............. H04W 72/0453; H04W 84/18; H04W 72/042; H04W 72/12; H04W 8/005; H04W 48/16; H04W 4/70
See application file for complete search history.

(56) References Cited

U.S. PATENT DOCUMENTS

| | | | |
|---|---|---|---|
| 2015/0326373 A1* | 11/2015 | Ryu ..................... | H04L 5/0092 370/330 |
| 2015/0382315 A1* | 12/2015 | Sorrentino .......... | H04W 56/002 370/329 |
| 2016/0044619 A1* | 2/2016 | Ryu ................... | H04W 72/0446 370/350 |
| 2016/0183205 A1 | 6/2016 | Li et al. | |
| 2016/0212721 A1* | 7/2016 | Sheng .................. | H04W 76/14 |
| 2016/0241420 A1* | 8/2016 | Sorrentino .......... | H04W 56/002 |
| 2018/0213498 A1* | 7/2018 | Khoryaev ......... | H04W 56/0015 |

OTHER PUBLICATIONS

Nokia Networks et al., "Sidelink synchronization procedure supporting V2V," 3GPP TSG-RAN WG1 Meeting #84, R1-160910, Malta, Feb. 15-19, 2016, 5 pages.

Office Action and Search Report dated Oct. 15, 2020 for Chinese Patent Application No. 201780049538.3, 6 pages.

Ericsson, "Further Discussions on Handling Timing Mismatch between GNSS and WAN Timing References," 3GPP TSG RAN WG4 Meeting #80, R4-165838; Gothenburg, Sweden; Aug. 22-26, 2016; 4 pages.

\* cited by examiner

500

502

504

UL subframe   SL subframe

1100

TECHNIQUE FOR PERFORMING DEVICE-TO-DEVICE OPERATION

CROSS REFERENCE TO RELATED APPLICATIONS

This application is a 35 U.S.C. § 371 national stage application of PCT International Application No. PCT/EP2017/068821, filed on Jul. 26, 2017, which claims the benefit of U.S. Provisional Patent Application Ser. No. 62/374,266, filed on Aug. 12, 2016, the disclosures and content of which are incorporated by reference herein in their entireties.

TECHNICAL FIELD

The present disclosure generally relates to a technique for performing a device-to-device operation. More specifically, and without limitation, methods and devices are provided for determining a reference time for the device-to-device operation.

BACKGROUND

During Release 12 of the 3$^{rd}$ Generation Partnership Project (3GPP), the Long Term Evolution (LTE) standard has been extended with support of a device-to-device (D2D) operation for a so-called sidelink (SL) targeting both commercial and Public Safety applications. The D2D operation according to 3GPP LTE Release 12 includes device discovery, which enables D2D devices to sense the proximity of another D2D device, and associated application by broadcasting and detecting discovery messages that carry device and application identities. The D2D operation further includes direct communication based on physical channels terminated directly between the D2D devices.

The D2D communication enables D2D devices in the proximity of each other to communicate in a peer-to-peer (i.e., direct) fashion, rather than communicating through a wireless access point or base station of the LTE radio access network. For example, D2D devices in an LTE system utilize the cellular uplink spectrum. That is, the D2D devices transmit D2D signals in the uplink part of the LTE spectrum.

A legacy D2D operation may support a half-duplex mode, i.e. the D2D device can either transmit D2D signals or receive D2D signals. A more advanced D2D operation may uses a further D2D device to relay D2D signals to one or more receiving D2D devices.

Based on the 3GPP contribution document R4-164751, "WF on RRM core requirement for V2V", LG Electronics, the Radio Resource Management (RRM) core requirements for vehicle-to-vehicle (V2V) operation are under study. The V2V operation typically uses a global navigation satellite system (GNSS) for acquiring timing information for the V2V operation on the sidelink.

Conventional D2D devices may be capable of supporting multiple GNSSs, e.g. Global Positioning System (GPS), Galileo, BeiDou, etc. While multiple GNSSs exist and may be supported by the D2D device, conventional D2D devices use a pre-defined GNSS.

However, using the pre-defined GNSS may be not optimal.

SUMMARY

Accordingly, there is a need for a technique that allows improving the coexistence of a wireless radio access network and a sidelink.

As to one aspect, a method of performing a device-to-device (D2D) operation is provided. The method comprises or triggers a step of obtaining, for each of two or more non-terrestrial synchronization sources, a first reference timing of the corresponding non-terrestrial synchronization source; a step of obtaining a second reference timing of a terrestrial synchronization source; a step of determining one of the non-terrestrial synchronization sources based on a comparison between the first reference timings and the second reference timing; and a step of performing the D2D operation using the first reference timing of the determined non-terrestrial synchronization source.

By determining the first reference timing underlying the D2D operation, e.g., for subframes of a sidelink (SL), depending on the second reference timing, e.g., underlying a terrestrial wireless access network (WAN), the coexistence of D2D operation and WAN operation can be improved.

The determining step may be implemented by determining, based on a comparison between the first reference timings and the second reference timing, at least one of the non-terrestrial synchronization sources and the first reference timings. Alternatively or in addition, the step of performing the D2D operation may be implemented using the at least one first reference timing of the determined at least one non-terrestrial synchronization source and/or using the determined at least one first reference timing.

The technique can be embodied to control the selection of the first reference timing for the D2D operation, e.g., a GNSS selection. A GNSS synchronization for the D2D operation may be aligned with a WAN synchronization, e.g., by determining matching first and second reference timings.

The method may be performed by a device (e.g., an LTE user equipment or UE) configured for the D2D operation (D2D device). The WAN may be an LTE radio access network (RAN). The terrestrial synchronization source may be a base station (e.g., an evolved Node B or eNB) of the WAN. The non-terrestrial synchronization sources may include GNSSs.

The D2D operation may include radio measurements (e.g., on the sidelink), vehicle-to-vehicle (V2V) communication or any other vehicle-based communication (V2x communication).

By way of example, the user equipment (UE) can be configured with sidelink subframes for V2V operation on the same carrier which is also used for WAN operation (e.g., uplink subframes of the WAN). The UE may use the eNB-based timing (e.g. autonomous adjustment or timing advance) for WAN operation, e.g., for a transmission on uplink subframes.

For V2V operation on the sidelink subframes, a conventional device may use any one of the first reference timings. Different GNSSs may lead to different D2D timings. However, there can be a timing misalignment between the WAN and some of the GNSSs leading to timing mismatch between the frame boundaries of uplink subframes of the WAN and sidelink subframes of the D2D operation, e.g., a timing misalignment between the WAN operation and D2D operation used for the V2V communication, as discussed in the contribution documents R4-164332 and R4-162563, "Discussions on V2V UE transmit timing requirements", Ericsson. The timing misalignment between GNSS and WAN reference timings can degrade WAN and/or D2D operations as any of the D2D devices in the WAN uses the GNSS for deriving the D2D timing.

To avoid performance degradation of WAN and D2D operations, the technique can be implemented for the D2D devices supporting multiple GNSSs.

The D2D device implementing the technique may use the GNSS that has least impact on the WAN operation, e.g., the GNSS leading to the smallest difference between the first reference timing of the GNSS and the second reference timing of the WAN. Hence, the technique can be implemented to ensure least degradation of both WAN performance and the D2D performance, e.g., when using time-shared resources on the same carrier.

Based on the comparison, out of multiple non-terrestrial synchronization sources, the one that leads to the smallest absolute value of the time misalignment between the second reference timing of the WAN and the corresponding first reference timing for the D2D operation may be determined. The second reference timing and the first reference timings may be expressed in terms of a start of a frame of the WAN and a start of a corresponding frame of the D2D operation, respectively.

Alternatively or in addition, the determining step may be controlled by requirements defined based on synchronization with a non-terrestrial synchronization source.

Any one of the reference timings may include a (e.g., unlimited and/or periodic) sequence of timing messages of the corresponding synchronization source. The determining step may be based on one or more timing messages of each synchronization source. The D2D operation may use further or other timing messages of the corresponding synchronization source than the one or more timing messages on which the determining step is based.

By way of example, a GPS satellite, as an example for the non-terrestrial synchronization source, may update the corresponding first reference timing by transmitting the timing message every 30 seconds.

The first reference timing may be obtained (e.g., directly or indirectly) from the corresponding non-terrestrial synchronization source. For example, a terrestrial transmitter may provide (e.g., forward or emulate) a signal from the corresponding non-terrestrial synchronization source. Alternatively or in addition, obtaining the first reference timing may include receiving assistance information for the corresponding non-terrestrial synchronization source, e.g., an almanac, an estimated code phase and/or an estimated Doppler shift of the corresponding non-terrestrial synchronization source.

The D2D operation may encompass a proximity service (ProSe). Alternatively or in addition, the D2D operation may encompass a vehicle-based operation, e.g., a vehicle-to-vehicle communication (V2V), a vehicle-to-infrastructure (V2I) communication or any other V2x communication.

The non-terrestrial synchronization sources may include synchronization sources within the atmosphere and/or outside the atmosphere. The non-terrestrial synchronization sources may include satellite-based synchronization sources, drone-based synchronization sources and/or balloon-based synchronization sources. Herein, a "drone" may encompass any motorized unmanned aircraft. A "balloon" may encompass any buoyancy-lifted aircraft.

The non-terrestrial synchronization sources may include at least two instances of a Global Navigation Satellite Systems, GNSSs; a satellite of at least one GNSS; and a GNSS-equivalent synchronization source. By way of example, for a known position, one satellite of a GNSS may provide one first reference timing. The GNSS-equivalent synchronization source may include a terrestrial transmitter that forwards or emulates a signal from the corresponding GNSS.

The D2D operation may relate to at least two D2D devices within range for direct or relayed radio communication. The method may be performed by one of the at least two D2D devices.

The method may further comprising or triggering a step of reporting the determined non-terrestrial synchronization source. E.g., a network node or a peer D2D device may be informed. The determined non-terrestrial synchronization source may be reported to the at least one other D2D device.

The terrestrial synchronization source may include a synchronization source device (e.g., the network node) comprised in a wireless access network (WAN). A device may be comprised in the WAN, if the device is within an area covered by the WAN, associated with the WAN, in a connected state with the WAN according to a Radio Resource Control (RRC) protocol and/or camped on a cell of the WAN. The synchronization source device may be a network node, a base station or an access point of the WAN.

The D2D operation may use radio resources in the uplink spectrum of the WAN. Alternatively or in addition, the D2D device that performs the method may be comprised in the WAN. The method may further comprise the step of communicating in the WAN. The communication in the WAN may not include the at least one other D2D device.

The D2D device that performs the method may determine the non-terrestrial synchronization source of the first reference timing so that the first reference timing used for the D2D operation is compatible with the second reference timing used for the communication in the WAN.

At least one of the D2D devices may be not comprised in the WAN. A device may be not comprised in the WAN, if the device is outside of the area covered by the WAN, not associated with the WAN, in an RRC-idle state and/or incompatible with a radio access technology (RAT) of the WAN.

The D2D device that performs the method may be comprised in the WAN, and the at least one other D2D device may be not comprised in the WAN, or vice versa. Alternatively or in addition, each of the D2D devices may be not comprised in the WAN.

The at least two D2D devices may include the D2D device that performs the method and the synchronization source device.

The D2D device that performs the method may determine the non-terrestrial synchronization source of the first reference timing so as to be compatible with the second reference timing received from the other D2D device as the synchronization source device.

The comparison may include determining, for each of the non-terrestrial synchronization sources, a relation between the first reference timing of the corresponding non-terrestrial synchronization source and the second reference timing. The relation may include at least one of a time misalignment and a drift between the first reference timing of the corresponding non-terrestrial synchronization source and the second reference timing.

The one non-terrestrial synchronization source may be determined if the corresponding relation fulfils a predefined margin and/or includes a minimum among the relations for the non-terrestrial synchronization sources.

Alternatively or in addition, using the first reference timing of the determined non-terrestrial synchronization source may include correcting the first reference timing depending on the corresponding relation.

At least one of the first reference timings and the second reference timing is obtained by time-correlating a signal received from the corresponding synchronization source with a predefined reference signal or synchronization signal.

The first reference timing of the determined non-terrestrial synchronization source may be used to define a frame structure of the D2D operation. The frame structure may be a radio frame structure. The frame structure may include at least one of subframes, slots and symbols.

The D2D operation may include or prepare at least one of a D2D discovery and a D2D communication. The D2D operation may include a radio transmission from a first D2D device to a second D2D device. The first D2D device, the second D2D device and/or the D2D devices to which the D2D operation relates may be comprised in or may define a D2D network. The first device or the second device may be the device performing the method. The radio transmission may include at least one of payload data and control signaling of the D2D operation.

The radio transmission may be scheduled based on the first reference timing of the determined non-terrestrial synchronization source.

The D2D operation may include at least one of transmitting or receiving sidelink synchronization signals; determining a starting time and/or a time period for receiving a radio signal from a D2D device or transmitting a radio signal to a D2D device; and performing a handover.

At least the step of obtaining the first reference timings or the method may be triggered by at least one of: discovering at least one of the non-terrestrial synchronization sources; receiving assistance information for at least one of the non-terrestrial synchronization sources; determining that the relation between a currently used first reference timing and the second reference timing exceeds a predefined margin; and determining that a received signal quality of a currently used non-terrestrial synchronization source, a D2D device or a network node falls below a predefined threshold.

The assistance information may be received from a terrestrial transmitter, e.g., from the network node of the WAN.

As to another aspect, a method of handling a device-to-device (D2D) operation is provided. The method comprises sending configuration information that triggers a step of obtaining, for each of two or more non-terrestrial synchronization sources, a first reference timing of the corresponding non-terrestrial synchronization source; a step of obtaining a second reference timing of a terrestrial synchronization source; a step of determining one of the non-terrestrial synchronization sources based on a comparison between the first reference timings and the second reference timing; and a step of performing the D2D operation using the first reference timing of the determined non-terrestrial synchronization source.

The method may further comprise any feature disclosed in the context of the one method aspect and/or one or more steps corresponding to any of the steps of the one method aspect.

One or each of the devices participating in the D2D operation may be a participant in the WAN. The WAN may communicate by means of electromagnetic induction, electromagnetic waves and/or optics. The WAN may be a radio access network (RAN). Alternatively or in addition, one or each of the devices participating in the D2D operation may be a network node (e.g., a base station) of the RAN, which may be configured to provide radio access in the RAN.

The one method aspect may be performed by a device configured to access the RAN (also referred to as radio node). The other method aspect may be performed by a device providing the radio access (also referred to as radio network node).

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the WAN and/or the Internet. Alternatively or in addition, the method may be encoded in a field-programmable gate array (FPGA) and/or an application-specific integrated circuit (ASIC), or the functionality may be provided for download by means of a hardware description language.

As to one device aspect, a device for performing a device-to-device (D2D) operation is provided. The device may be configured to perform the one method aspect. Alternatively or in addition, the device comprises a first obtaining unit configured to obtain, for each of two or more non-terrestrial synchronization sources, a first reference timing of the corresponding non-terrestrial synchronization source; a second obtaining unit configured to obtain a second reference timing of a terrestrial synchronization source; a determining unit configured to determine one of the non-terrestrial synchronization sources based on a comparison between the first reference timings and the second reference timing; and a performing unit configured to perform the D2D operation using the first reference timing of the determined non-terrestrial synchronization source.

As to another device aspect, a device for handling a device-to-device (D2D) operation is provided. The device may be configured to perform the other method aspect. Alternatively or in addition, the device comprises a sending unit configured to send configuration information that triggers a step of obtaining, for each of two or more non-terrestrial synchronization sources, a first reference timing of the corresponding non-terrestrial synchronization source; a step of obtaining a second reference timing of a terrestrial synchronization source; a step of determining one of the non-terrestrial synchronization sources based on a comparison between the first reference timings and the second reference timing; and a step of performing the D2D operation using the first reference timing of the determined non-terrestrial synchronization source.

As to one further aspect, a device, preferably a radio node, for performing a device-to-device (D2D) operation is provided. The device comprises a first reference timing module for obtaining, for each of two or more non-terrestrial synchronization sources, a first reference timing of the corresponding non-terrestrial synchronization source; a second reference timing module for obtaining a second reference timing of a terrestrial synchronization source; a determination module for determining one of the non-terrestrial synchronization sources based on a comparison between the first reference timings and the second reference timing; and a D2D module for performing the D2D operation using the first reference timing of the determined non-terrestrial synchronization source.

The device may be wirelessly connected or connectable to a wireless access network (WAN).

As to another further aspect, a device, preferably a network node, for handling a device-to-device (D2D) operation is provided. The device comprises a first reference timing configuration module for configuring obtaining, for each of two or more non-terrestrial synchronization sources, a first reference timing of the corresponding non-terrestrial synchronization source; a second reference timing configuration module for configuring obtaining a second reference timing of a terrestrial synchronization source; a determination configuration module for configuring determining one of the non-terrestrial synchronization sources based on a comparison between the first reference timings and the second reference timing; and a D2D configuration module for configuring performing the D2D operation using the first reference timing of the determined non-terrestrial synchronization source.

The device may be configured to provide wireless connectivity in a wireless access network (WAN).

The devices and/or the nodes may further include any feature disclosed in the context of the method aspects. Particularly, any one of the units and modules, or a dedicated unit or module, may be configured to perform one or more of the steps of any one of the method aspects.

In some embodiments, a term "network node" may be used to encompass any type of radio network node or any network node, which communicates with a UE and/or with another network node. Examples of network nodes include a NodeB (NB), a Master eNode B (MeNB), a Secondary eNode B (SeNB), a network node belonging to a Master Cell Group (MCG) or a Secondary Cell Group (SCG), a base station (BS), multi-standard radio (MSR) radio node such as MSR BS, an evolved NB (eNodeB or eNB), a network controller, a radio network controller (RNC), a base station controller (BSC), a relay, a donor node controlling relay, a base transceiver station (BTS), an access point (AP), a transmission point, a transmission node, a Remote Radio Unit (RRU), a Remote Radio Head (RRH), a node in a distributed antenna system (DAS), a core network node (e.g. MSC, MME, etc.), or a node for O&M, OSS, SON, positioning (e.g. a Serving Mobile Location Center or E-SMLC), Minimization of Drive Tests (MDT), etc.

In some embodiments, a term "user equipment" (UE) may be used to encompass any type of wireless device communicating with a network node and/or with another UE in a cellular or mobile communication system. Examples of UEs include a target device, device-to-device (D2D) UE, machine-type UE or UE capable of machine-to-machine (M2M) communication, a personal digital assistant (PDA), PAD, Tablet, mobile terminals, smart phone, laptop embedded equipped (LEE), laptop mounted equipment (LME), Universal Serial Bus (USB) dongles, proximity services (ProSe) UE, V2V UE, V2x UE, etc.

In some embodiments a term "radio node" may be used to encompass a wireless access network (WAN) node or radio access network (RAN) node. The radio node can be a UE (e.g., a D2D UE) or a network node (e.g. access point, BS, etc.). The WAN node is also interchangeably called as cellular node, network source node, etc.

In some embodiments a term "GNSS source" (or interchangeably "GNSS node", "GNSS system" or "GNSS") may be used to encompass any type of navigational satellite system (GNSS), which can transmit signals enabling a UE to acquire certain time reference, e.g. enable the UE to achieve or attain time synchronization. The satellite signals may be emulated and/or transmitted by one or more terrestrial nodes, e.g., so that the UE perceives the received signals as satellite signals. Non-limiting examples of GNSS systems include GPS, GLONASS, BeiDou Navigation Satellite, Galileo, etc.

In some embodiments, a term "time reference" may be used to encompass a parameter or signal used by the UE to acquire time synchronization with respect to a synchronization source. Examples of synchronization source include GNSS source, WAN node etc. The time reference may contain information about a local or a universal time, e.g. UTC, base station frame start timing, etc. The time reference may provide information about the absolute time of the start of a time resource in a system, e.g. start of frame or subframe or time slot of WAN node. The time reference may interchangeably be referred to as a system time reference, WAN node time reference, GNSS time reference, reference time, reference timing, synchronization time reference or timing.

The embodiments are described for LTE. However, the embodiments are applicable to any RAT or multi-RAT systems, wherein the UE receives and/or transmit signals (e.g. data), e.g. LTE FDD/TDD, WCDMA/HSPA, GSM/GERAN, Wi Fi, WLAN, CDMA2000, 5G, NR, etc.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a Long Term Evolution (LTE) implementation or a successor thereof, it is readily apparent that the technique described herein may also be implemented in any other wireless communication network, including a Wireless Local Area Network (WLAN) according to the standard family IEEE 802.11 (e.g., IEEE 802.11a, g, n or ac) and/or a Worldwide Interoperability for Microwave Access (WiMAX) according to the standard family IEEE 802.16.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the functions and steps or implement the units and modules disclosed herein.

Figure 1:
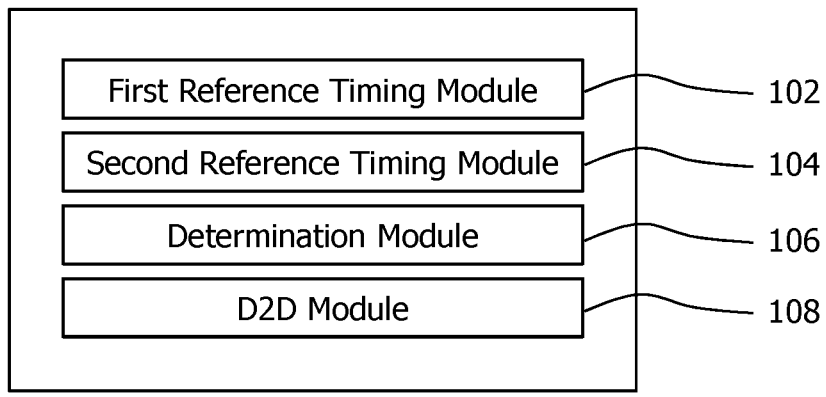
FIG. 1 shows a schematic block diagram of a device for performing a device-to-device operation.

FIG. 1 schematically illustrates a block diagram of a device 100 for performing a device-to-device (D2D) operation. The device 100 comprises a first reference timing module 102 for obtaining first reference timings from at least two non-terrestrial synchronization sources, and a second reference timing module 104 for obtaining a second reference timing from a terrestrial synchronization source. A determination module 106 determines one of the non-terrestrial synchronization sources by comparing their first reference timings with the second reference timing. A D2D module 108 performs the D2D operation based on the first reference timing of the determined non-terrestrial synchronization source.

The device 100 may be embodied by a radio node or any wireless device configured for the D2D operation (D2D device). The D2D operation involves at least two D2D devices, e.g., the device 100 and at least one counterpart for the D2D operation of module 108. At least one or each of the D2D devices embodies the device 100.

Figure 2:
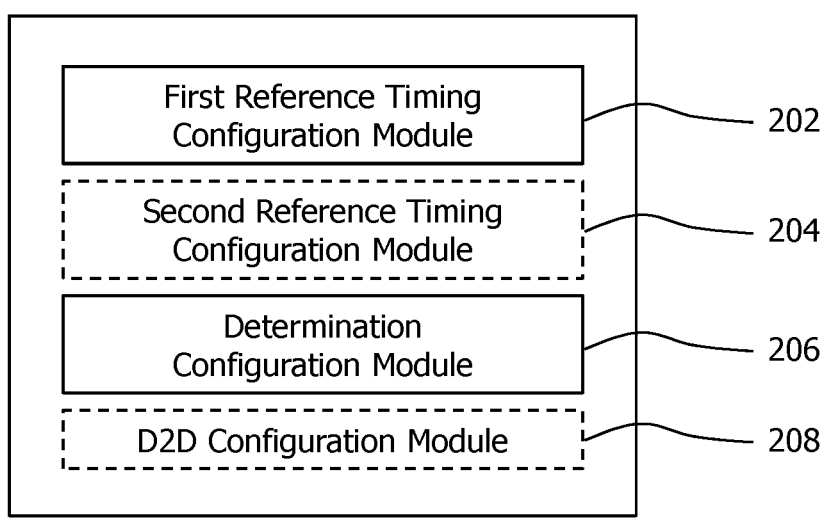
FIG. 2 shows a schematic block diagram of a device for handling a device-to-device operation.

FIG. 2 schematically illustrates a block diagram of a device 200 for handling (e.g., controlling or supporting) a D2D operation. The device 200 comprises a first reference timing configuration module 202 for configuring a radio node to obtain, for each of two or more non-terrestrial synchronization sources, a first reference timing of the corresponding non-terrestrial synchronization source.

Optionally, the device 200 comprises a second reference timing configuration module 204 for configuring the radio node to obtain a second reference timing of a terrestrial synchronization source. The module 204 may be omitted, e.g., if the radio node is (e.g., according to a communication standard) configured to obtain the second reference timing from the terrestrial synchronization source for any D2D operation or upon cell search.

The device 200 further comprises a determination configuration module 206 for configuring the radio node to determine one of the non-terrestrial synchronization sources based on a comparison between the first reference timings and the second reference timing.

Optionally, the device 200 further comprises a D2D configuration module 208 for configuring the radio node to perform the D2D operation using the first reference timing of the determined non-terrestrial synchronization source. The module 208 may be omitted, e.g., if the D2D operation is out of network coverage. Alternatively, the module 208 may support the D2D operation, e.g., by granting radio resources (e.g., for data transmission and/or control signaling) and/or by relaying the data transmission and/or the control signaling.

The device 200 may be embodied by a network node. The network node may be a base station, an access point or any (e.g., cellular, local or global) controller of a wireless access network (WAN, e.g., a radio access network, RAN).

The terrestrial synchronization source may be provided by the WAN. The network node, e.g., the device 200, may be the terrestrial synchronization source and/or may provide the first reference timing.

The radio node, e.g., the device 100, may be configured for both communicating in the WAN and for the D2D operation. The radio node may be a user equipment (UE). In a 3GPP LTE implementation of the WAN, the network node may be an evolved Node B (eNodeB or eNB).

Figure 3:
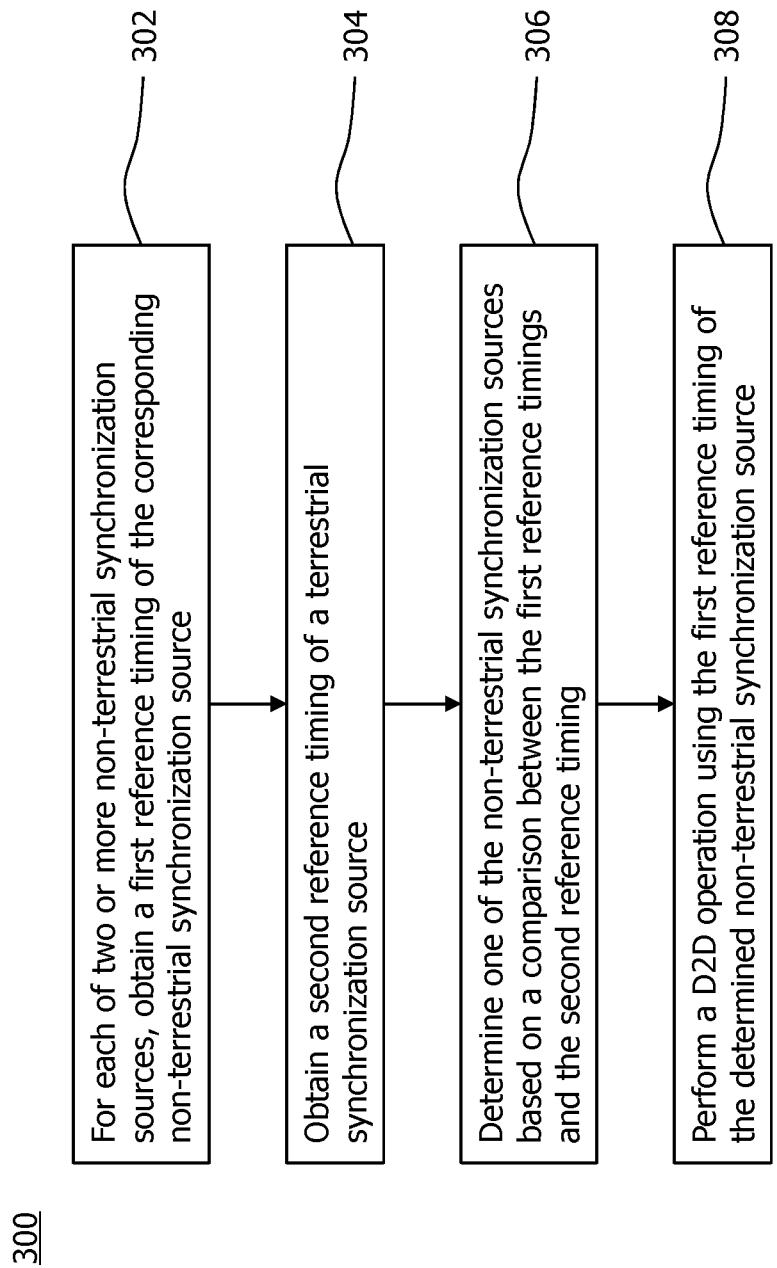
FIG. 3 shows a flowchart for a method of performing a device-to-device operation, which is implementable by the device of FIG. 1.

FIG. 3 shows a method 300 of performing a D2D operation. The method comprises or triggers a step 302 of obtaining, for each of two or more non-terrestrial synchronization sources, a first reference timing of the corresponding non-terrestrial synchronization source; a step 304 of obtaining a second reference timing of a terrestrial synchronization source; a step 306 of determining one of the non-terrestrial synchronization sources based on a comparison between the first reference timings and the second reference timing; and a step 308 of performing the D2D operation using the first reference timing of the determined non-terrestrial synchronization source.

The method 300 may be performed by the device 100, e.g., at the radio node. For example, the modules 102, 104, 106 and 108 may perform the steps 302, 304, 306 and 308, respectively.

Figure 4:
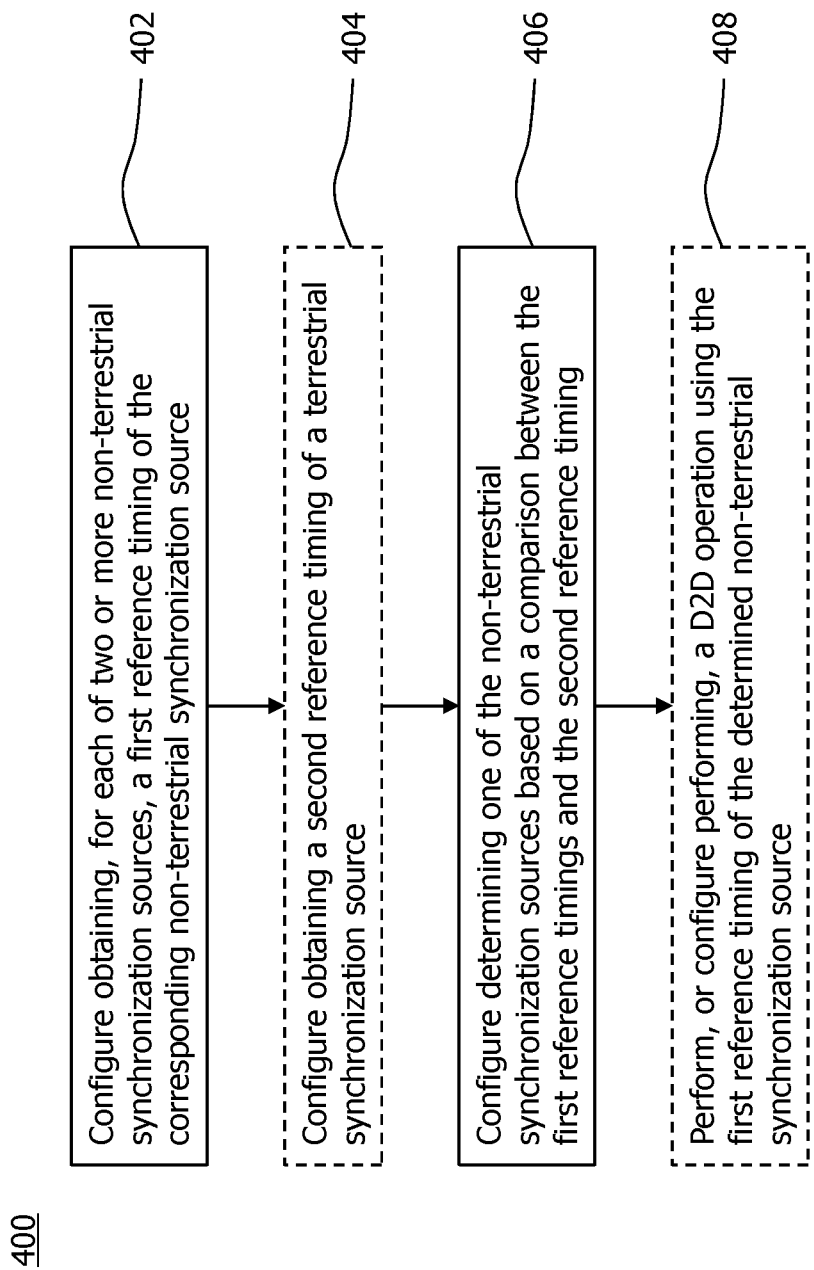
FIG. 4 shows a flowchart for a method of handling a device-to-device operation, which is implementable by the device of FIG. 2.

FIG. 4 shows a flowchart for a method 400 of handling a D2D operation. The method 400 comprises one or more steps of sending configuration information to a radio node. The configuration information triggers the radio node to perform the method 300. Alternatively or in addition, the method 400 comprises a step 402 of configuring the radio node to obtain, for each of two or more non-terrestrial synchronization sources, a first reference timing of the corresponding non-terrestrial synchronization source; an optional step 404 of configuring the radio node to obtain a second reference timing of a terrestrial synchronization source; a step 406 of configuring the radio node to determine one of the non-terrestrial synchronization sources based on a comparison between the first reference timings and the second reference timing; and an optional step 408 of performing, or controlling the radio node to perform, the D2D operation using the first reference timing of the determined non-terrestrial synchronization source.

The method 400 may be performed by the device 200, e.g., at the network node. For example, the modules 202, 204, 206 and 208 may perform the steps 402, 404, 406 and 408, respectively.

Herein, D2D operation is a generic term which may comprise a transmission and/or a reception of any type of D2D signals (e.g., radio signals and/or on a physical channel) for discovery (e.g., by notifying another D2D device or discovery another D2D device) and/or for communication (e.g., with another D2D device). The D2D operation is therefore also referred to as D2D transmission, D2D reception, D2D communication etc. A device (e.g., the device 100 or 200) that is capable of the D2D operation may be referred to as D2D device (e.g., a D2D UE).

Radio resources, e.g., a physical channel, used for the D2D operation are also referred to as a sidelink (SL). Accordingly, subframes occupied for the D2D operation are also referred to as D2D subframes or SL subframes. In contrast, subframes occupied for operating the WAN are referred to as WAN subframes.

Figure 5:
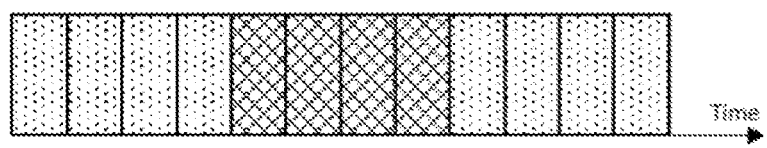
FIG. 5 schematically illustrates sequences of subframes.
Figure 5:
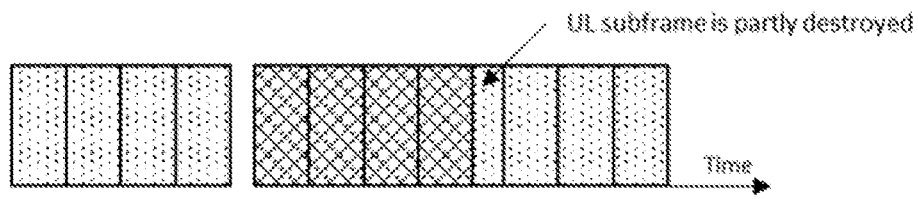
Figure 5:
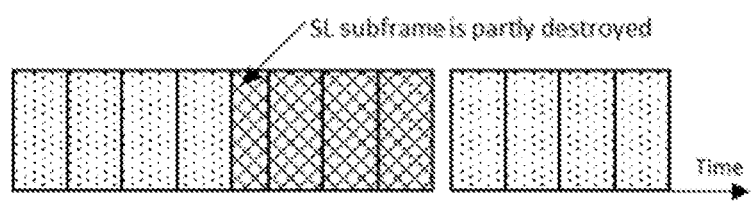
Figure 5:
Figure 5:

FIG. 5 schematically illustrates a time multiplexing of subframes of a WAN and subframes of the D2D operation, e.g., on the same carrier frequency. Using an arbitrary or predetermined non-terrestrial synchronization source for the D2D operation may cause a time misalignment between WAN subframes and D2D subframes, which can be avoided by the technique.

The time domain of the WAN subframes is controlled according to the second reference timing of the terrestrial synchronization source of the WAN. The time domain of the D2D operation is controlled according to the first reference timing of one of the non-terrestrial synchronization sources.

The upper third of FIG. 5 schematically illustrates a subframe sequence 500, which can be achieved by the technique. The boundaries of the D2D subframes and the WAN subframes (e.g., the UL subframes) do not overlap. The non-terrestrial synchronization source (e.g., a global navigation satellite system or GNSS system) determined in the step 306 and/or 406 and the second reference timing (e.g., the WAN timing) are aligned.

The center and lower thirds of FIG. 5 schematically illustrate comparative examples 502 and 504 of a subframe sequence. The frame boundaries of the frames that comprise the D2D subframes and the WAN subframes are not aligned relative to each other, because of a mismatch between the first reference timing of a selected non-terrestrial synchronization source (e.g., a predetermined GNSS system) and the second reference timings of the terrestrial synchronization source (e.g., the WAN).

In the comparative examples 502, the GNSS reference timing lags behind the WAN timing resulting in that a D2D subframe overshoots beyond the start of the WAN subframe. In other word, the start of the D2D operation is delayed. This degrades the WAN transmission (e.g., the UL transmission) in said WAN subframe.

Furthermore, in the comparative examples 504, the GNSS reference timing is ahead of the WAN timing resulting in that a D2D subframe is started before the end of the WAN subframe. In other words, the start of the D2D operation is too early. This in turn degrades the D2D operation (e.g., the V2V operation) in the D2D subframe.

The WAN may be any terrestrial radio network. The WAN may be a cellular radio network and/or a network comprising beacon nodes transmitting radio signals for positioning purpose. The network node may be a base station providing radio access in a cell of the cellular radio network or an access point transmitting beacon frames.

Figure 6:
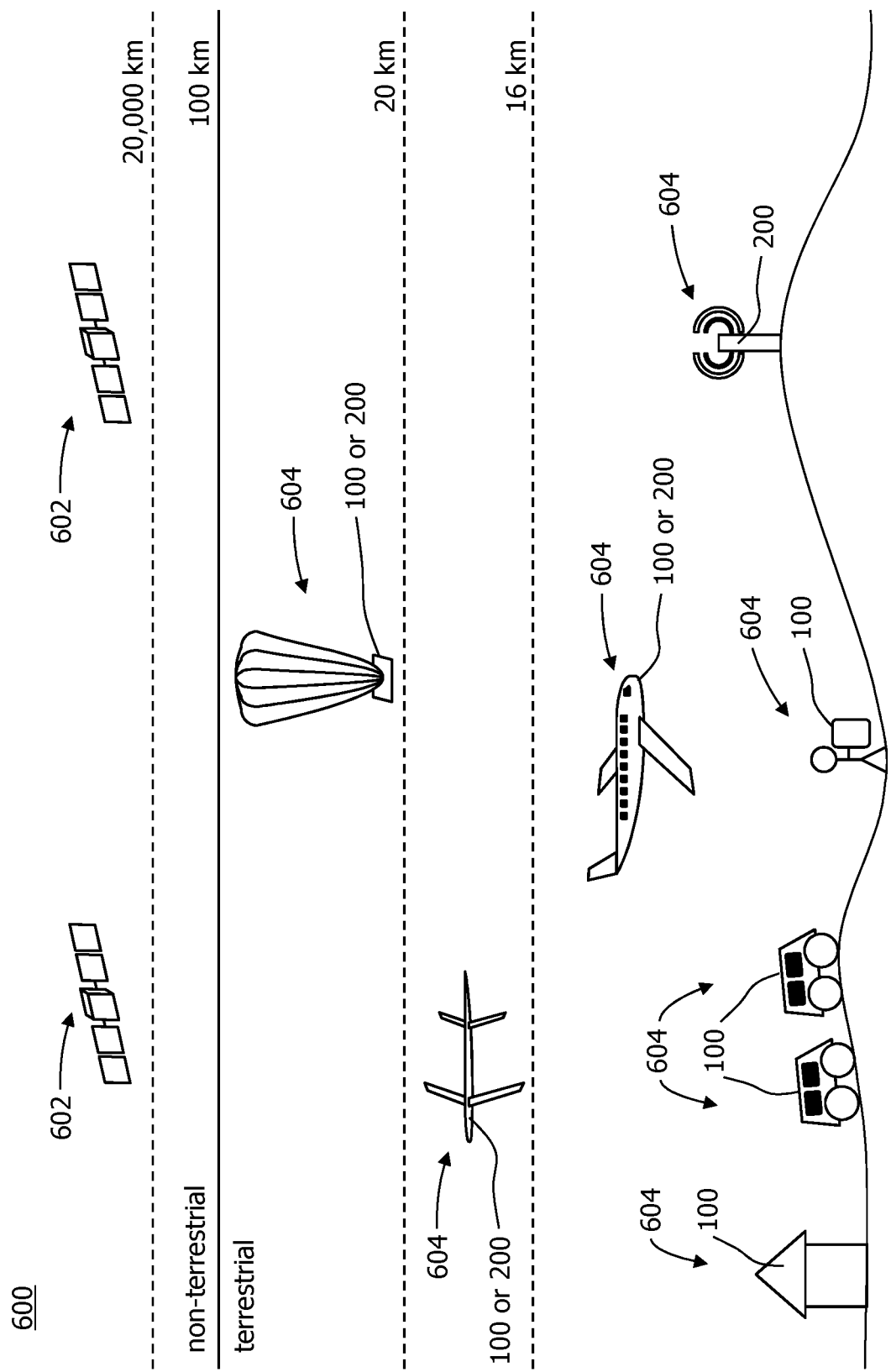
FIG. 6 schematically illustrates a first example of an environment for the devices of FIGS. 1 and 2.

FIG. 6 shows a first example of a network environment 600 for the D2D operation. Embodiments of the non-terrestrial synchronization sources 602 include satellite navigation systems, e.g., GNSSs, or individual satellites thereof.

By way of example, any airborne synchronization source above a height (e.g., measured above terrain) or an altitude (e.g., measured above mean sea level) of 100 km may function as one of the non-terrestrial synchronization sources 602.

Embodiments of the devices 100, e.g., the radio nodes, may be included in production halls (e.g., sensors, actuators or robots), in home automation systems (e.g., sensors, actuators or household appliances), in mobile devices (e.g., handheld devices or wearable devices) and/or in vehicles (e.g., ground-based vehicles or aircrafts).

Embodiments of the devices 200 (e.g., the network nodes) may be included in base stations. Such base stations may be ground-based (e.g., on buildings or poles) or airborne. Alternatively or in addition, embodiments of the devices 100 are airborne.

For example, a commercial aircraft and/or unmanned aircrafts may implement the device 100 or 200. The unmanned aircrafts may include solar-powered drones and helium-lifted balloons.

Furthermore, any one of the embodiments of the device 100 or 200 (e.g., each of the embodiments of the device 200) may further be an embodiment of a terrestrial synchronization source 604.

By way of example, any synchronization source that defines or controls (e.g., locally) the time domain structure of the WAN may function as the terrestrial synchronization source 604 in the step 304. Alternatively or in conjunction, any ground-based synchronization source or any airborne synchronization source below a height or an altitude of 100 km may function as the terrestrial synchronization source 604.

Figure 7:
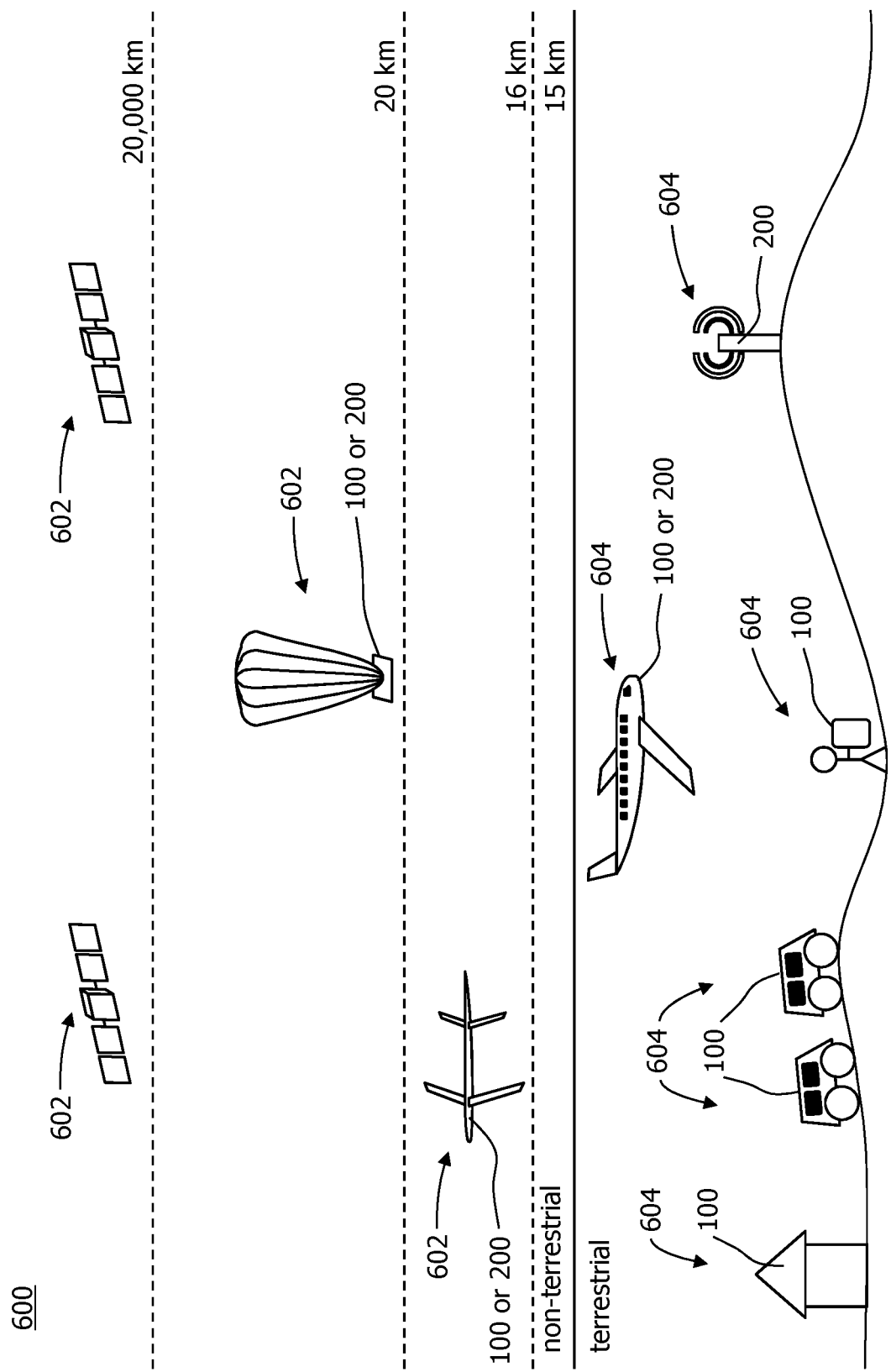
FIG. 7 schematically illustrates a second example of an environment for the devices of FIGS. 1 and 2.

FIG. 7 shows a second example of the network environment 600 for the D2D operation that is combinable with the first example.

The non-terrestrial synchronization source 602 may be any system (e.g., any navigation system) configured to provide the first timing information. By way of example, the first timing information may encompass any timing information that is independent of the WAN and/or available over an area that is greater than the area covered by the WAN or the network node of the WAN.

By way of example, any airborne synchronization source above a height or an altitude of 15 km may function as one of the non-terrestrial synchronization sources 602 in the step 302. Embodiments of the non-terrestrial synchronization sources 602 include at least one of satellite navigation systems (or individual satellites thereof), balloon-based navigation or timing systems (or individual balloon-based platforms thereof) and drone-based navigation or timing systems (or individual drone-based platforms thereof).

An implementation of the method 300 in a radio node as the device 100 is described. The device 100 may be a D2D-capable UE and/or V2x-capable UE or a radio network node, e.g., according to 3GPP.

In the step 302, a set of first reference timings, $T=(T_i; i=1, 2, 3, \ldots)$, of two or more GNSS systems is obtained. In the step 304, a second reference timing, $T_r$, of a radio node comprised in a terrestrial radio network is obtained.

A relation between at least one of the first reference timings and the second reference timing is determined in the step 306. Optionally, determining the relation comprises determining an amount of time misalignment, $D_i$, and/or drift of the time misalignment, $D'_i$, between the first reference timing $T_i$ and the second reference timing $T_r$.

At least based on the determined relation, one reference timing is selected from the set T in the step 306. In the step 308, the selected reference timing is used for one or more operational tasks (e.g., for preparing or performing the D2D operation). Optionally, another node (e.g., another D2D device functioning as a peer of the D2D operation) is informed about the selection result, e.g., in the step 306 prior to the step 308.

Below exemplary implementations of the steps of the method 300 are, in any subcombination, combinable with above implementations, embodiments and aspects.

In an implementation of the step 302, the device 100 (e.g., an UE) may obtain a set of first reference timings of two or more GNSS systems. The device 100 may obtain one or more of the first reference timings with or without assistance information from another node. The assistance information may include the corresponding GNSS or GNSS-equivalent timing information.

For example, the device 100 may decode the system information broadcasted by the GNSS system 602. Alternatively or in addition, the device 100 may use assistance information (e.g. subframe timing, symbol timing, etc.) from other (e.g., terrestrial) nodes in the WAN to detect the presence of one or more GNSSs 602 or GNSS-equivalent systems 602.

The obtaining step 302 may further comprise determining a time of arrival (ToA) of the corresponding one or more first reference signals.

Alternatively or in addition, the device 100 may decide to obtain the set of first reference timings from the plurality of non-terrestrial synchronization sources 602 (e.g., GNSS systems) in the step 302 or may be triggered to perform the method 300 based on at least one of the following events or conditions. Furthermore, the device 100 may autonomously decide to perform the step 302 or the method 300, e.g., by detecting any of the events or applying any of the conditions.

A first event includes the availability of one or more non-terrestrial synchronization sources 602 (e.g., GNSS systems), e.g., at the location of the device 100.

A second event includes the reception of assistance information, e.g. from the network node of the WAN or any terrestrial transmitter. For example, the first reference timing of one or more of the non-terrestrial synchronization sources 602 may be obtained according to the step 302, when assistance information is available (e.g., from the WAN).

A third event includes a current relation between a first reference timing (e.g., based on a currently selected GNSS) and a second reference timing (e.g., based on the WAN) not meeting one or more criteria (e.g., to make it possible to reselect to another first reference timing).

A fourth event includes the magnitude of the difference between a first reference timing (e.g., based on a currently selected GNSS) and a second reference timing (e.g., based on the WAN) being greater than a threshold, e.g. a cyclic prefix (CP) length of the symbol used for transmitting (e.g., cellular) signals or symbols (e.g., in the WAN).

A fifth event includes a signal quality of radio signals received at the device 100 from another radio node (e.g., of the WAN or of the D2D operation) falling below a threshold. A sixth event includes a signal quality of radio signals received at the device 100 from the network node of the WAN falling below a threshold. A seventh event includes a signal quality of radio signals received at the device 100 from at least one non-terrestrial synchronization source (e.g., GNSS system) falling below a threshold.

An eighth event includes a time elapsed since the last reference time determination or selection (e.g., a previous instance of the step 306) being greater than a threshold.

A ninth event includes a time drift of the currently used first reference timing being above or about to exceed a threshold.

In an implementation of the step 304, the device 100 (e.g., an UE) may obtain a second reference timing of a radio node 604 (e.g., an embodiment of the device 200) comprised in the WAN. The second reference timing is also referred to as WAN reference timing or WAN time reference.

In one example, the obtaining step 304 may be based on synchronization signals and/or reference signals transmitted by the radio node 604 (e.g., the network node) comprised in the WAN.

In another combinable example, the second reference timing may be (or may be indicative of) a start time of a time resource used by a node of the WAN, e.g., an embodiment of the device 100 or 200 being further configured for radio communication in the WAN.

The node of the WAN using the time resource may be the terrestrial synchronization source 604. Alternatively or in addition, the node of the WAN using the time resource and/or the terrestrial synchronization source 604 may be a base station (e.g., an eNB) of the WAN or an access point of the WAN, a UE connected or connectable with the WAN, a WAN synchronization source (e.g. standalone radio node such as beacon etc.).

If multiple terrestrial synchronization sources 604 of the WAN are available, the device 100 may select one of the terrestrial synchronization sources 604 based on one or more criteria. Examples of the criteria include signal strength, frequency of transmission of synchronization signals by the terrestrial synchronization source 604, etc. For example the device 100 may select the terrestrial synchronization source 604 with the strongest signal quality for obtaining the second reference timing.

Examples of time resource include (e.g., orthogonal frequency-division multiplexing or OFDM) symbol, time slot, subframe, frame, System Frame Number (SFN), transmission time interval (TTI), interleaving time, etc. The second reference timing may be the start time of the frame of the network node of the WAN. Alternatively or in addition, the second reference timing may be the time reference of another node of the WAN and is obtained by receiving a signal encoding or incorporating the corresponding time reference information. In yet another example, the second reference timing may be the time reference of another WAN node and is acquired by receiving and decoding a message containing the corresponding time reference information.

In an implementation of the step 306, the device 100 (e.g., an UE) may determine the relation between at least one of the first reference timings and the second reference timing.

The relation may comprise one or more metrics, e.g., any one or more of the following metrics.

The relation may include the amount of the time misalignment, $D_i$, or the drift, $D'_i$, between the first reference timing $T_i$ and the second reference timing $T_r$ (e.g., according to above optional substep of the step 306). The relation may include a functional relation between the first and the second reference timings. Examples of functions (for determining the functional relation) include difference, subtraction, ratio, absolute difference, etc.

The relation may include a logical relation, e.g., whether or not a function of the first and second reference timings is above a first threshold and/or below a second threshold.

The relation may include a time difference of arrival of first reference signals for corresponding the first reference timing and arrival of second reference signals for the second reference timing. The difference can be expressed using an arithmetic scale or logarithmic scale.

An example of an expression of a function for $D_i$, which may be applied in any of above metrics, relates the corresponding first reference timing $T_i$ and the second reference timing $T_r$, e.g., according to $$D_i = f(T_i, T_r, \beta),$$

wherein $\beta$ is an implementation margin, e.g., related to a radio receiver of the device 100. In a special case, $\beta=0$.

In any of above functions or metrics, the parameters $T_i$ and $T_r$ may be current or instantaneous values (e.g., measured over a time resource such as time slot, frame etc.) or averaged over multiple time resources.

More specifically, an example of the function $D_i$ includes the absolute difference between $T_i$ and $T_r$, e.g., according to $$D_i = |Ti - Tr|.$$

In any of above implementations or a further implementation of the step 306, the device 100 (e.g., an UE) may determine (or select) one non-terrestrial synchronization source 602, e.g., the Global Positioning System (GPS) or another GNSS, out of the plurality of non-terrestrial synchronization sources 602. The determination of the non-terrestrial synchronization source 602 may be based on the determined relation.

For example, the determination 306 of the non-terrestrial synchronization source 602 comprises determining the first reference timing $T_i$ corresponding to the smallest absolute value, abs($D_i$), of $D_i$. E.g., the GNSS 602 that is least misaligned in time with the second reference timing is selected.

Alternatively or in addition, the determination 306 of the non-terrestrial synchronization source 602 comprises determining a $T_i$, if the result of the relation is below a first threshold and/or above a second threshold.

The determination or selection of the non-terrestrial synchronization source 602 may comprise determining or selecting a new reference timing/reference system or reselecting the current or old reference timing/reference system.

In any implementation of the step 306, the determination or selection of the non-terrestrial synchronization source 602 may also comprise prioritizing the (e.g., determined or selected) non-terrestrial synchronization source 602 over one or more other non-terrestrial synchronization sources 602 (e.g., other GNSSs).

An implementation of the step 308 may include performing one or more operational tasks. For example, the step 308 may be implemented by or may comprises any one or more of the following substeps.

A first substep comprises determining a time to receive a radio signal or a channel. The radio signal or channel may be transmitted by a radio node as a peer of the D2D operation. The transmitting radio node may be another embodiment of the device 100. Alternatively or in addition, the transmitting radio node may be a UE or a base station, e.g., of the WAN. Optionally, the time to receive is a function of the determined relation.

A second substep comprises determining a time to transmit a radio signal or a channel to a radio node. The radio node receiving the radio signal or channel may be another embodiment of the device 100. Alternatively or in addition, the receiving radio node may be a UE or a base station, e.g., of the WAN. Optionally, the time to transmit is a function of the determined relation.

A third substep comprises determining a time for an activity state and/or inactivity state, e.g., an ON duration of the device 100 when in discontinuous reception (DRX). A fourth substep comprises positioning.

A fifth substep comprises performing a radio measurement. The radio measurement performed by the device 100 may be performed over known signals (e.g., reference signals or pilot sequences). The radio measurements may be performed on reference signals such as Cell-specific Reference Signals (CRS), Channel State Information Reference Signals (CSI-RS) or Demodulation Reference Signals (DMRS).

The radio measurement performed by the device 100 may be performed on a serving cell, on one or more neighbor cells and/or on the SL. The radio measurement may be done on an intra-frequency carrier, on one or more inter-frequency carriers and/or on one or more inter-RAT carriers (e.g., depending upon whether the device 100 supports that RAT). The inter-frequency and inter-RAT measurements of the device 100 may be performed in measurement gaps. The WAN, e.g., the device 200, may configure the measurement gaps.

The radio measurements can be done for various purposes, e.g., for mobility, positioning, self-organizing network (SON), minimization of drive tests (MDT), operation and maintenance (O&M), network planning and optimization, etc. The radio measurements may be done in all Radio Resource Control (RRC) states of the device 100, e.g., in an RRC idle state and an RRC connected state.

Examples of measurements in LTE include cell identification (also known as Physical cell identity, or PCI, acquisition), Reference Symbol Received Power (RSRP), Reference Symbol Received Quality (RSRQ), cell global ID (CGI) acquisition, Reference Signal Time Difference (RSTD), Receiver Signal Strength Indication (RSSI) measurement, channel occupancy measurement, UE RX-TX time difference measurement, Radio Link Monitoring (RLM), which consists of Out-of-Synchronization detection and In-Synchronization detection, etc.

Alternatively or in addition, Channel State Information (CSI) measurements performed by the device 100 are used for scheduling, link adaptation, etc., e.g., by the WAN and/or for the D2D operation. Examples of CSI measurements or CSI reports include Channel Quality Indicator (CQI), Precoding Matrix Indicator (PMI), rank indicator (RI), etc.

The radio measurement may also include a cell search. In the downlink radio resources of the WAN, the subframe #0 and the subframe #5 carry synchronization signals (e.g., a Primary Synchronization Signal, PSS, and a Secondary Synchronization Signal, SSS). In order to identify an unknown cell (e.g. a new neighbor cell), the device 100 may acquire the timing of that cell and eventually the physical cell ID (PCI). This is also referred to as cell search or cell identification. Subsequently, the device 100 may measure the RSRP and/or the RSRQ of the newly identified cell for an autonomous decision and/or for reporting the measurement to the network node of the WAN. An LTE implementation of the WAN may include up to 504 PCIs.

A sixth substep comprises receiving a signal, channel or a message (e.g., unicast, multicast or broadcast) from another node, e.g., a peer embodiment of the device 100 for the D2D operation.

A seventh substep comprises monitoring or receiving control information, paging or system information; performing sensing; time and/or frequency tracking; synchronization and/or resynchronization to the same or a different synchronization source 602 or 604; and transmitting a message or indication in response to any of the above; performing a handover to another radio node or cell comprised in the WAN.

An eighth substep comprises applying a compensation to the first reference timing, $T_i$, and/or to the second reference timing, $T_r$. The compensation maybe computed based on the determined relation between $T_i$ and $T_r$, and/or the determined relation between and $T_r$, (for a j-th synchronization source 602 that is different from the i-th synchronization source 602).

In any implementation of the step 308, the D2D operation may be based on a certain frame structure, e.g., according to Frequency Division Duplex (FDD), Time Division Duplex (TDD), Half Duplex (HD)-FDD, Frame Structure type 3 (FS3), etc.

In an implementation of the optional step of informing (e.g., reporting) as to the determined non-terrestrial synchronization source 602, the device 100 (e.g., a UE) may inform, implicitly or explicitly, another node (e.g., the peer embodiment for the D2D operation) about the selection result of the step 306.

For example, the device 100 may signal an indication of the selected non-terrestrial synchronization source 602 to one or more other nodes (e.g., UE or radio network node).

Examples of the other nodes, which receive the determined information, include the radio network node of the WAN (e.g. eNode B, base station, access point, etc.), D2D UEs, D2D relay UEs (or Proximity Service relays), IoT devices, Narrow Band IoT devices, core network nodes, positioning nodes or any other node used for dedicated services (e.g., a SON node). The other nodes to which the determined information is reported may be under operator control or third party control. The other nodes receiving the report may include the receiving node of the D2D communication.

Reporting to or sharing with other nodes the result of the step 306 (i.e., the determined information) can have significant advantages. One advantage is that the same information or a part of the information may be applicable to other nodes in the WAN or the D2D network. For example, the synchronization source 602 can be reused by other D2D devices without repeating the method 300. Alternatively or in addition, the D2D operation (e.g., a V2x operation) over multiple carriers, multiple D2D devices and/or cells can be further coordinated, e.g., in order to further improve the WAN and/or the performance of the D2D operation (e.g., the V2x operation). In this way, the potential gains can be achieved in larger scale (e.g., as to the number of D2D devices 100). A second advantage is that determining the misalignment in the step 306 of the method 300 can be quite complex sometimes. This can be done in one place and only once, and then signaled to other nodes in the network. In this way, processing in the different nodes in the network can be reduced.

An implementation of the method 400 in a radio network node as the device 200 is described. In the step 402, the device 100 (e.g., a UE, preferably a D2D- and/or V2x-capable UE) is configured to obtain a set of first reference timings $T=(T_i; i=1, 2, 3, \ldots)$ of two or more GNSS systems.

In the optional step 404, the device 100 (e.g., the UE) is configured to obtain a second reference timing, $T_r$, of a radio node (e.g., the device 200) comprised in a WAN.

In the step 406, the device 100 (e.g., the UE) is configured with at least one parameter related to a function to be used by device 100 for determining a relation between at least one of the first reference timings and a second reference timing.

Optionally, e.g., in the step 406 or the step 408, the device 200 determines one reference timing from the set T at least based on the determined relation, or the device 200 configures the device 100 to perform the determination 306.

Alternatively or in addition, e.g., in the optional step 408, the device 200 uses the selected reference timing for one or more operational tasks, or the device 200 configures the device 100 to perform D2D operation 308 (e.g., by granting radio resources to the device 100 and/or further D2D devices).

Implementations of the steps of method 400 performed by the network node as the device 200 are described in more detail.

In the step 402, the device 200 may configure the device 100 (e.g., the UE) to obtain a set of first reference timing of two or more GNSS systems. The configuration can be done using dedicated signaling, e.g. via RRC signaling on a shared channel when the device 100 is in RRC_CONNECTED state. All or a plurality of radio nodes (e.g., embodiments of the devices 100) in RRC_IDLE state in the same cell (e.g., the cell served by the device 200) may be configured by the device 200 to obtain a set of first reference timings of two or more GNSS systems, e.g., according to any of above implementations of the step 302.

In the optional step 404, the device 200 may configure the device 100 to obtain a second reference timing of a radio node (e.g., the device 200) comprised in a WAN or any other terrestrial radio network. The configuration can be done using dedicated signaling, e.g. via RRC signaling on a shared channel when the device 100 is in RRC_CONNECTED state. All or a plurality of radio nodes (e.g., embodiments of the devices 100) in RRC_IDLE state in the same cell (e.g., the cell served by the device 200) may be configured by the device 200 to obtain a set of first reference timing of two or more GNSS systems, e.g., according to any of above implementations of the step 304.

In the step 406, the device 200 may configure the device 100 with one or more parameters related to a function to be used by the device 100 for determining a relation between at least one of the first reference timings and a second reference timing. The device 200 may signal the function or parameter directly or, it may indicate, request or signal the device 100 to use one of a set of predefined functions.

After applying the function in the step 306, the device 100 is caused to select one first reference timing from the available set of first reference timings obtained in previous steps. The device 100 may use that reference timing to perform one or more operational tasks in the step 308.

Optionally, the device 200 and/or any other network node of the WAN receives, from the device 100, a report indicative of the selected first reference timing, i.e., the non-terrestrial synchronization source 602 determined in the step 306. The device 200 uses the first reference timing of the reported non-terrestrial synchronization source 602 for one or more operational tasks, e.g., in the step 408.

Alternatively or in addition, in the step 406, the device 200 determines the first reference timing selected by the UE, e.g., by evaluating the same function that is used by the device 100 in the step 306.

In yet another alternative or in addition, the device 200 determines, e.g. in the step 406 or 408, the first reference timing and/or the corresponding non-terrestrial synchronization source 602. For example, the network node (as the device 200) of the WAN selects the first reference timing based on feedback or measurement information received from the device 100.

In the step 408, the device 200 optionally performs one or both of selecting one first reference timing from the set T at least based on the determined relation; and using the selected first reference timing for one or more operational tasks (wherein first reference timing may be selected by the device 100 or 200).

The D2D operation may also be referred to as a proximity service (ProSe). A D2D device (e.g., a UE, the device 100, a network node or the device 200) may interchangeably be called a ProSe-capable device or ProSe device. Similarly, the D2D operation may interchangeably be called a ProSe operation.

A D2D-discovery capable device may be referred to as device capable of ProSe direct discovery and D2D direct communication device may also be referred to as a device capable of ProSe direct communication.

The link, the channel and/or the carrier that is used for the ProSe direct communication and/or the ProSe direct discovery between ProSe devices (e.g., embodiments of the device 100) is referred to as sidelink (SL). The ProSe operation performed or controlled by the device 100 and/or the device 200 may broadly comprise of ProSe reception (e.g., receiving ProSe signals) and/or ProSe transmission (e.g., transmitting ProSe signals).

Figure 8A:
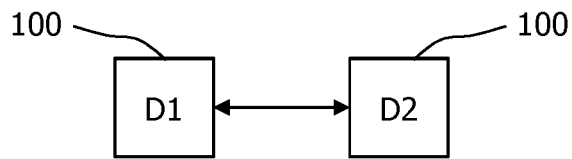
FIG. 8 schematically illustrates different coverage scenarios for the devices of FIGS. 1 and 2.
Figure 8B:
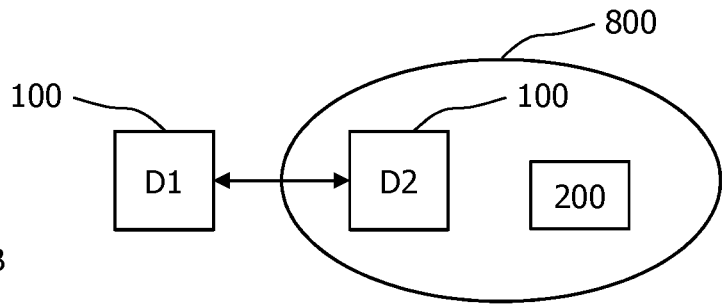
Figure 8C:
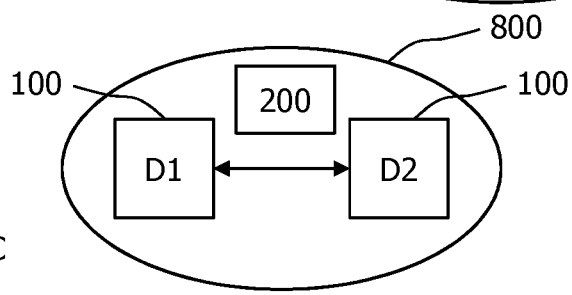

FIGS. 8A, 8B and 8C schematically illustrate scenarios in which the D2D operation (i.e., the ProSe operation) may be supported.

FIG. 8A schematically illustrates an instance of the D2D operation with Out of Network Coverage (ONC, "out of coverage" or "any cell selection state"). In the ONC scenario, none of the D2D devices 100 involved in the D2D operation (e.g., a D2D communication or defining the D2D network) is under coverage by the WAN. None of the D2D devices 100 can receive signals from and/or transmit signals to any of the network nodes of the WAN, i.e., to devices 200.

FIG. 8B schematically illustrates an instance of the D2D operation with Partial Network Coverage (PNC or "partial coverage"). In the PNC scenario, at least one of the D2D devices 100 among the D2D devices 100 involved in D2D communication (or defining the D2D network) is under the coverage 800 of the WAN. At least one D2D device 100 among the D2D devices 100 involved in D2D communication (or defining the D2D network) is not under the coverage 800 of the WAN.

FIG. 8C schematically illustrates an instance of the D2D operation In Network Coverage (INC or "in coverage"). In the INC scenario, the D2D devices 100 are under the full coverage of one or more network nodes as the devices 200. Each of the D2D devices 100 is able to receive signals from and/or transmit signals to at least one network node as the device 200. The D2D device 100 may also maintain a communication link with the network node as the device 200.

The D2D operation may include (e.g., in addition or prior to a data transmission on the SL) control signaling. E.g. in PNC or INC, the device 200 may transmit some control information for the D2D operation to the devices 100, and/or the device 100 may transmit some other control information to the other D2D devices (e.g., further devices 100) or one or more devices 200 (e.g., one or more eNBs) of the WAN.

The control information may include D2D resource grants for D2D communication transmitted by the device 200, e.g., via cellular downlink control channels. The D2D transmissions may occur on radio resources that are configured by the WAN or selected autonomously by one or more of the D2D devices 100.

In an LTE implementation, D2D communication supports two different modes of D2D operation. In mode 1, the location (e.g., in time and/or frequency) of radio resources for transmission of a scheduling assignment by the device 100, that is transmitting or broadcasting in the step 308, is configured by the device 200 or another network node of the WAN. The location of the one or more resources for transmission of the D2D data by the device 100 in the step 308 is configured by the device 200 or another network node of the WAN.

In mode 2, a pool of radio resource for scheduling assignment is pre-configured and/or semi-statically allocated. The device 100, on its own, selects the radio resource for scheduling assignment (e.g., in the step 308) from the resource pool for scheduling assignment to transmit its scheduling assignment.

Figure 9:
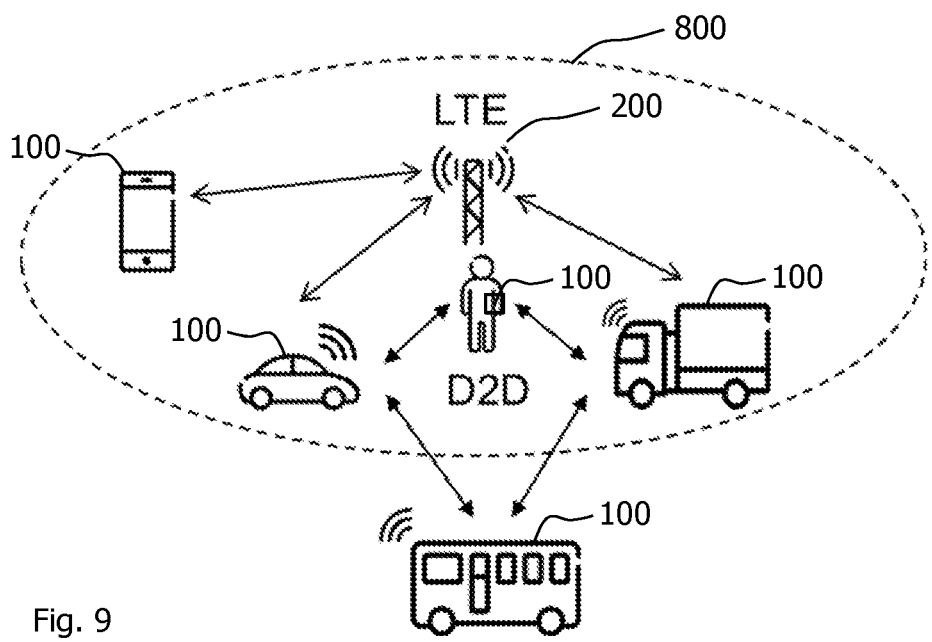
FIG. 9 schematically illustrates a coexistence of a wireless access network operation and a device-to-device operation.

FIG. 9 schematically illustrates the D2D operation (indicated by solid arrows) as an extensions of the LTE operation of the WAN (indicated by lined-arrows) for an LTE-based WAN.

The D2D operation may support a vehicular or "V2x" operation, which includes any combination of direct communication between vehicles, pedestrians and infrastructure. Therefore, "x" in "V2x" may denote "vehicular" (or V2V), or may denote "pedestrian" (or V2P) or may denote "infrastructure" (or V2I), etc. Any implementation or embodiment described herein may be applicable for any type of D2D operation including ProSe and V2x.

The V2x communication may take advantage of infrastructure of the WAN (e.g., the devices 200), if available (e.g., in PNC or INC). In addition, at least basic V2x connectivity may be available even in case of lack of WAN coverage (e.g., in ONC). Providing an LTE-based V2x interface may be economically advantageous because of the LTE economies of scale and it may enable tighter integration between communications with the WAN infrastructure (e.g., using V2I) and V2P and V2V communications, as compared to using a dedicated V2x technology (e.g., a RAT other than LTE).

V2x communications may carry non-safety and/or safety information. Each of the applications and services may be associated with specific requirements sets, e.g., in terms of latency, reliability, capacity, etc. The European Telecommunications Standards Institute (ETSI) has defined two types of messages for road safety, e.g., including co-operative Awareness Message (CAM) and Decentralized Environmental Notification Message (DENM).

The V2V operation may support higher velocities compared to legacy cellular devices, e.g., an absolute velocity of 250 km/h and/or a relative velocity of 500 km/h. Unlike legacy devices, the V2V devices may be wireless connected while moving fast, and the operating scenario can be quite dense. As V2V operation is based on ProSe and/or D2D technology, the V2V operation may operate both in-coverage (INC or PNC) and out-of-network coverage (ONC). The V2V operation may use a dedicated spectrum (e.g., licensed spectrum) or it can operate with shared spectrum (e.g., unlicensed spectrum and/or spectrum including 5 GHz, 6 GHz or higher radio frequency bands).

The dedicated spectrum may be strictly assigned to the V2V operation. The shared spectrum may be shared between several other technologies. In an example, the LTE uplink spectrum (or a certain portion thereof) may be shared between LTE uplink and the V2V operation. In another example, the spectrum may be shared between unlicensed technology (e.g., a RAT based on IEEE 802.11) and the V2V operation.

Figure 10:
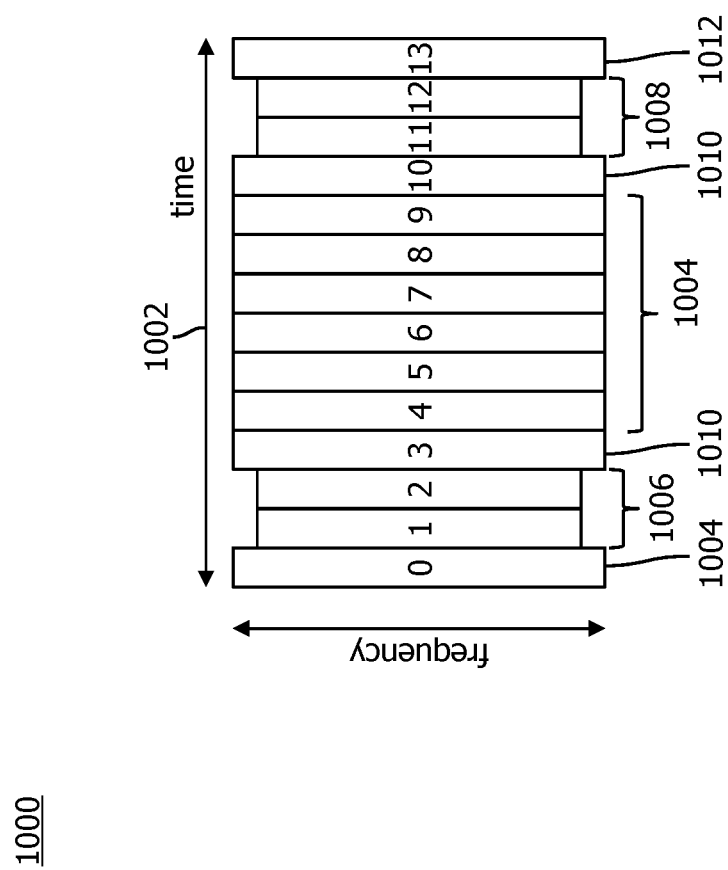
FIG. 10 schematically illustrates a subframe structure for a device-to-device operation.

FIG. 10 schematically illustrates a subframe structure 1000 for the D2D operation. E.g., 14 subframes are comprised in a radio frame 1002. D2D data or D2D messages may be transmitted on a Physical SL Broadcast Channel (PSBCH) 1004.

If the devices 100 (e.g., UEs) are within WAN coverage, the synchronization may be derived from downlink signals transmitted by the device 200 or any network node (e.g., an eNodeB) of the WAN. In LTE, these signals are the Primary and the Secondary Synchronization Signals (PSS and SSS). The devices 100 derive from these two signals the frequency and the second time reference so that the devices 100 can access the radio resources without creating interference to other users of the WAN. In addition, these two signals carry the identifier of the cell (Physical Cell ID or PCI).

In the D2D operation (which may also be referred to as direct mode of the device 100), e.g., if ONC, there a need to share common frequency and/or time references between D2D devices, e.g., embodiments of the device 100. Hence, at least one embodiment of the device 100 transmits (e.g., in the step 308) signals for that purpose on the SL. The sidelink synchronization signals include a Primary Sidelink Synchronization Signals (PSSS) 1006 and a Secondary Sidelink Synchronization Signals (SSSS) 1008. Each of the PSSS 1006 and/or the SSSS 1008 may be computed from a Zadoff-Chu sequence (e.g., of length 62). The PSSS 1006 and/or the SSSS 1008 are transmitted on the 62 carriers in the center of the SL spectrum (with the frequency indicated on the vertical axis in FIG. 10).

The PSSS 1006 and the SSSS 1008 carry a sidelink identifier (SID). The SID indicates whether the device 100 transmitting the sidelink synchronization signals 1006 and 1008 has derived its synchronization from the second reference timing of the WAN or from the first reference timing determined in the step 306 and/or the step 406.

Figure 11:
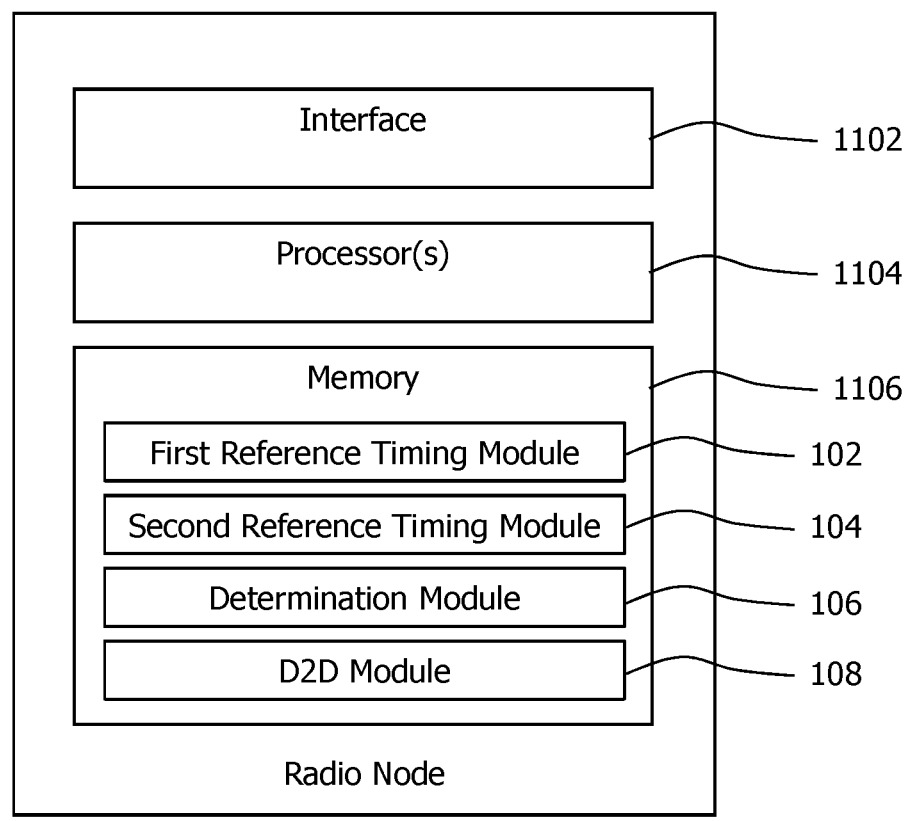
FIG. 11 shows a schematic block diagram a radio node embodiment of the device of FIG. 1.

FIG. 11 shows a schematic block diagram for a radio node embodiment 1100 of the device 100. The embodiment 1100 comprises an interface 1102 connected or connectable to an antenna or antenna array of the device 100.

The embodiment 1100 comprises one or more processors 1104 and memory 1106 operatively coupled to one or more processors 1104. The memory 1106 is encoded with instructions that cause the one or more processors 1104 to perform the method 300. For example, the memory 1106 may include the modules 102, 104, 106 and 108.

Figure 12:
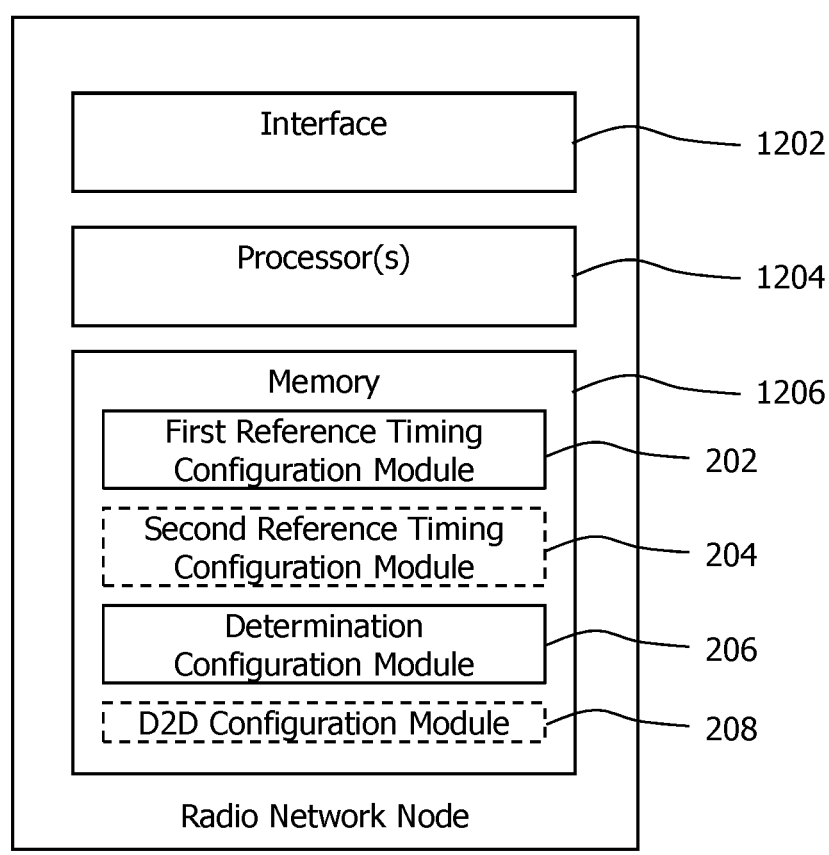
FIG. 12 shows a schematic block diagram a network node embodiment of the device of FIG. 2.

FIG. 12 shows a schematic block diagram for a network node embodiment 1200 of the device 200. The embodiment 1200 comprises an interface 1202 connected or connectable to an antenna or antenna array of the device 200.

The embodiment 1200 comprises one or more processors 1204 and memory 1206 operatively coupled to one or more processors 1204. The memory 1206 is encoded with instructions that cause the one or more processors 1204 to perform the method 400. For example, the memory 1206 may include the modules 202 and 206, and optionally, the module 204 and/or 208.

As has become apparent from above description of exemplary embodiments, the technique can be implemented to select from a plurality of GNSS systems, e.g., to optimize the reference timing used for other purposes, e.g., D2D and/or V2x communication. The impact of D2D and/or V2x operation on WAN communication can be minimized in at least some embodiments. E.g., there is no or negligible degradation on the WAN communication. The technique can be implemented to enhance the performance of D2D and/or V2X operation, e.g., since the D2D device has a capability of selecting the most optimal GNSS timing reference with least timing misalignment.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of performing a device-to-device, D2D, operation, the method comprising:
   for each of two or more non-terrestrial synchronization sources, obtaining a first reference timing of the corresponding non-terrestrial synchronization source;
   obtaining a second reference timing of a terrestrial synchronization source;
   determining one of the two or more non-terrestrial synchronization sources based on a comparison between the first reference timings and the second reference timing; and
   performing the D2D operation using the first reference timing of the determined non-terrestrial synchronization source,
   wherein the comparison includes for each of the non-terrestrial synchronization sources, determining a relation between the first reference timing of the corresponding non-terrestrial synchronization source and the second reference timing, and
   wherein using the first reference timing of the determined non-terrestrial synchronization source further includes correcting the first reference timing depending on the corresponding relation.

2. The method of claim 1, wherein the D2D operation relates to at least two D2D devices within range for direct or relayed radio communication, and the method is performed by one of the at least two D2D devices.

3. The method of claim 2, wherein the determined non-terrestrial synchronization source is reported to the at least one other D2D device.

4. A method of performing a device-to-device, D2D, operation, the method comprising:
   for each of two or more non-terrestrial synchronization sources, obtaining a first reference timing of the corresponding non-terrestrial synchronization source;
   obtaining a second reference timing of a terrestrial synchronization source;
   determining one of the two or more non-terrestrial synchronization sources based on a comparison between the first reference timings and the second reference timing; and
   performing the D2D operation using the first reference timing of the determined non-terrestrial synchronization source,
   wherein the comparison includes for each of the non-terrestrial synchronization sources, determining a relation between the first reference timing of the corresponding non-terrestrial synchronization source and the second reference timing, and
   wherein the one non-terrestrial synchronization source is determined if the corresponding relation fulfils a predefined margin and/or includes a minimum among the relations for the non-terrestrial synchronization sources.

5. The method of claim 1, wherein at least one of the first reference timings and the second reference timing is obtained by time-correlating a signal received from the corresponding synchronization source with a predefined reference signal or synchronization signal.

6. The method of claim 1, wherein at least the step of obtaining the first reference timings is triggered by at least one of:
   discovering at least one of the non-terrestrial synchronization sources;
   receiving assistance information for at least one of the non-terrestrial synchronization sources;
   determining that the relation between a currently used first reference timing and the second reference timing exceeds a predefined margin; and
   determining that a received signal quality of a currently used non-terrestrial synchronization source, a D2D device or a network node falls below a predefined threshold.

7. A device for performing a device-to-device, D2D, operation, the device comprising:
   a processor; and
   a memory storing program code that is executed by the processor to perform operations comprising:
   for each of two or more non-terrestrial synchronization sources, obtaining a first reference timing of the corresponding non-terrestrial synchronization source;
   obtaining a second reference timing of a terrestrial synchronization source;

determining one of the two or more non-terrestrial synchronization sources based on a comparison between the first reference timings and the second reference timing; and performing the D2D operation using the first reference timing of the determined non-terrestrial synchronization source, wherein the comparison includes for each of the non-terrestrial synchronization sources, determining a relation between the first reference timing of the corresponding non-terrestrial synchronization source and the second reference timing, and wherein using the first reference timing of the determined non-terrestrial synchronization source further includes correcting the first reference timing depending on the corresponding relation.

8. The device of claim 7, wherein: the relation includes at least one of a time misalignment and a drift between the first reference timing of the corresponding non-terrestrial synchronization source and the second reference timing.

9. The device of claim 7, wherein:
at least one of the first reference timings and the second reference timing is obtained by time-correlating a signal received from the corresponding synchronization source with a predefined reference signal or synchronization signal.

10. The method of claim 1, wherein the relation includes at least one of a time misalignment and a drift between the first reference timing of the corresponding non-terrestrial synchronization source and the second reference timing.

11. The method of claim 4, wherein the D2D operation relates to at least two D2D devices within range for direct or relayed radio communication, and the method is performed by one of the at least two D2D devices.

12. The method of claim 11, wherein the determined non-terrestrial synchronization source is reported to the at least one other D2D device.

13. The method of claim 4, wherein the relation includes at least one of a time misalignment and a drift between the first reference timing of the corresponding non-terrestrial synchronization source and the second reference timing.

14. The method of claim 4, wherein at least one of the first reference timing and the second reference timing is obtained by time-correlating a signal received from the corresponding synchronization source with a predefined reference signal or synchronization signal.

15. The method of claim 4, wherein at least the step of obtaining the first reference timing is triggered by at least one of:

discovering at least one of the non-terrestrial synchronization sources;

receiving assistance information for at least one of the non-terrestrial synchronization sources;

determining that the relation between a currently used first reference timing and the second reference timing exceeds a predefined margin; and determining that a received signal quality of a currently used non-terrestrial synchronization source, a D2D device or a network node falls below a predefined threshold.

16. A device for performing a device-to-device, D2D, operation, the device comprising:
a processor; and
a memory storing program code that is executed by the processor to perform operations comprising:
for each of two or more non-terrestrial synchronization sources, obtaining a first reference timing of the corresponding non-terrestrial synchronization source;
obtaining a second reference timing of a terrestrial synchronization source;
determining one of the two or more non-terrestrial synchronization sources based on a comparison between the first reference timings and the second reference timing; and
performing the D2D operation using the first reference timing of the determined non-terrestrial synchronization source,
wherein the comparison includes for each of the non-terrestrial synchronization sources, determining a relation between the first reference timing of the corresponding non-terrestrial synchronization source and the second reference timing, and
wherein the one non-terrestrial synchronization source is determined if the corresponding relation fulfils a predefined margin and/or includes a minimum among the relations for the non-terrestrial synchronization sources.

17. The device of claim 16, wherein the relation includes at least one of a time misalignment and a drift between the first reference timing of the corresponding non-terrestrial synchronization source and the second reference timing.

18. The device of claim 16, wherein at least one of the first reference timings and the second reference timing is obtained by time-correlating a signal received from the corresponding synchronization source with a predefined reference signal or synchronization signal.

* * * * *